Patented Mar. 7, 1944

2,343,431

UNITED STATES PATENT OFFICE 2,343,431

FILTER

Donald H. Wells, Maplewood, N. J., and Melvin De Groote, University City, Mo., assignors to Purolator Products, Inc., Newark, N. J., a Corporation of Delaware No Drawing. Application February 28, 1941,
Serial No. 381,122

19 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature, pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering medium with a product of esterification produced by reaction between a polybasic carboxy acid and an hydroxylated amide in which there is present directly attached to the amide nitrogen an acyl radical derived from a detergent-forming monocarboxy acid having at least 8 carbon atoms. The ester product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Detergent-forming carboxy acids are those acids having at least 8 carbon atoms which have the capacity to react with alkali to form soap or soap-like products and are exemplified by fatty acids having 8 to 32 carbon atoms such as oleic, linoleic, ricinoleic, stearic, hydroxy-stearic, palmitic, trihydroxypalmitic, erucic, clupanodonic, etc. The term detergent-forming carboxy acid includes naphthenic acids. Naphthenic acids are derived from various petroleums or are obtained by treatments which involve oxidation of hydrocarbon bodies present in naturally occurring crude oils. The number of carbon atoms in naturally occurring naphthenic acids may vary from 10 carbon atoms to 38 carbon atoms. Naphthenic acids or acid admixtures of the type available on the open market and which preferably have a saponification value in the neighborhood of 250 are suitable. Also included among the detergent-forming acids are those mono-carboxy acids, sometimes called wax acids or paraffin acids, which are formed as a result of oxidation of paraffin or petroleum waxes, particularly those derived from paraffin base petroleums, and which include hydroxylated acids as well as non-hydroxylated acids. Acids occurring in certain waxes such as carnaubic acid, cerotic acid, lanopalmic acid and lanoceric acid are also considered detergent-forming mono-carboxy acids. Rosin and resinic acids such as abietic acid are likewise included. Such acid materials due to the fact that they react with alkalis to form soap or soap-like products are commonly called detergent-forming acids. Ester products which we have found to be useful for increasing the dirt removal rate of filtering media for filtering lubricating oils and the like comprise one or more acyl groups derived from such detergent-forming carboxy acids directly attached to an amide nitrogen.

The detergent-forming carboxy acid which supplies the acyl radical may, of course, be subjected to modifications which do not destroy the ability to form a soap or soap-like body. For instance oleic acid may be chlorinated and chlorinated oleic acid used instead of oleic acid. Rosin may be hydrogenated and resulting hydrogenated abietic acid may be used. Naphthenic acids may be brominated and used in brominated form. In such cases the acids still possess detergent-forming characteristics and the term "detergent-forming acid" is regarded herein as including such modifications.

The amides referred to herein are compounds in which at least one hydrogen of ammonia or of a corresponding primary or secondary amine has been replaced by an acyl radical derived from a mono-carboxy detergent-forming acid. Such amides may be regarded as including the group RCO—N, RCO being the conventional acyl radical of a detergent-forming carboxy acid, at least one or more RCO groups being attached to the N atom of the amide.

Polybasic carboxy acids which may be employed in the esterification reactions include those of the aromatic, alkyl, aralkyl, alicyclic, and heterocyclic types and may be exemplified by phthalic, succinic, malic, fumaric, citric, citriconic, maleic, adipic, tartaric, glutaric, diphenic, naphthalic, oxalic, mesoaxalic, pimelic, suberic, azelaic, sebacic, aconitic, etc. Other suitable polybasic carboxy acids may be prepared by the diene synthesis which involves condensation of alpha, beta unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthetic reaction involving condensation of an alpha, beta unsaturated mono-carboxy acid with a carboxy acid containing a conjugated double bond. For example, crotonic acid may be condensed with abietic acid, which contains a conjugated double bond, to yield a dicarboxy acid suitable for use in the manufacture of ester products adapted for use in increasing the rate of dirt removal from lubricating oils in a filtering operation. When reference is made to polybasic carboxy acids the anhydrides thereof are also included. Modifications which are the functional equivalents such as acyl chloride derivatives, or such as chlor phthalic acid, are also included.

Ester products which may be used in the practice of this invention for increasing the filtering rate of filtering media may be obtained in various ways. One simple way of obtaining a suitable ester product is to react a polybasic carboxy acid with an amide (either a simple amide or a substituted amide) which contains a free hydroxyl in an acyl radical derived from a detergent-forming acid having at least 8 carbon atoms, the esterification reaction being through the hydroxyl contained in the acyl radical. For example, a suitable ester product may be prepared by reacting a polybasic carboxy acid with an amide in which the acyl group is derived from an hydroxylated fatty acid.

Amides derived from fatty acids such as stearamide, oleoamide and the like, are well known and are prepared by well known methods. Ricinoleoamide which contains an hydroxylated acyl radical is also well known. Other amides derived from hydroxy fatty acids, such as hydroxy stearamide, dihydroxy stearamide, etc., can be prepared in a similar way. Mono-substituted or disubstituted amides of hydroxy fatty acids may be obtained in a similar way by reaction of an hydroxy fatty acid with a substance such as aniline, benzylamine, butylamine, amylamine, hexylamine, diamylamine, cyclohexanolamine, toluidine, methylaniline, diphenylamine, etc. The word "amide" is intended to include the substituted as well as the unsubstituted types. The amide of polyricinoleic acid can be prepared in the manner described in German Patent No. 552,251, to Deutsche Hydrierwerke, A. G., Rodleben, issued June 10, 1932. This particular material will be referred to as polyricinoleo-amide. Ammonolysis of the ethyl ester of oxidized ricinoleic acid yields oxy ricinoleo amide.

Amides of the character above referred to containing at least one alcoholiform hydroxyl or the equivalent react readily with polybasic carboxy acids to produce ester products in the form of amides of detergent-forming acids in which an hydroxyl or the equivalent contained in the acyl radical derived from the detergent-forming acid is replaced by a polybasic carboxy acid residue. By way of exemplifying a preferred ester product and of illustrating a typical procedure for making such a product, the esterification of ricinoleo-amide with phthalic acid will be described. 500 pounds of ricinoleo-amide in intimate admixture with 250 pounds of phthalic anhydride is maintained at a temperature of about 120° to 145° C. for approximately 6 to 12 hours. The reaction can be followed roughly by withdrawing a small sample of the partially reacted mass and noting its solubility in chloroform. Phthalic anhydride is insoluble in chloroform, and upon completion of the reaction, complete solubility in chloroform is obtained.

In addition to the above fatty acid amides derived from castor oil as a parent material are especially desirable for use in forming suitable ester products. Oxalic acid and maleic acid are especially desirable polybasic carboxy acids which may be used in the preparation of suitable ester products.

Suitable products of esterification can likewise be prepared by reacting a polybasic carboxy acid with an hydroxylated amide which includes an acyl radical derived from a detergent-forming carboxy acid and wherein the hydroxyl that is replaced by the polybasic carboxylic acid residue is not attached to the acyl part of the amide compound but is attached to an organic radical or residue that is in the amino hydrogen position and that does not contain an acyl radical directly attached to the amide nitrogen. Thus a desired procedure for making a suitable esterified amide is to first obtain an amide containing an acyl radical of a mono-basic detergent-forming acid and also containing an alcoholic hydroxyl attached to a non-acyl residue which replaces an amino hydrogen atom and then react the amide with a polybasic carboxy acid or its anhydride through such alcoholic hydroxyl.

Hydroxy amides suitable for reaction with polybasic carboxy acids and containing an hydroxylated group or residue which replaces an amino-hydrogen atom and which does not contain an acyl radical directly attached to the amide nitrogen may be prepared in several ways. One simple way of preparing such amides is to react a monocarboxy detergent-forming acid with an alkylolamine. Thus a detergent-forming acid may be caused to react with a monoalkylolamine such as monoethanolamine, monopropanolamine, monobutanolamine, tris (hydroxy methyl) amino methane, etc., or with a dialkylolamine such as diethanolamine, dipropanolamine, dibutanolamine, etc. Such types, due to the likelihood of ester formation, are best obtained by use of alkylene oxides, as mentioned subsequently. In a similar way such alkylol amines may be caused to react with the acyl chloride derived from a detergent-forming carboxy acid or with an ester of a detergent-forming carboxy acid, e. g. an ethyl ester, to form an hydroxylated amide.

Hydroxylated amides suitable for reaction with polybasic carboxylic acids may also be prepared by causing a non-hydroxylated amide to react with an alkylene oxide such as ethylene oxide, propylene oxide, butylene oxide and the like. The amide in such case need not be derived from an alkylol amine but may be derived from amines such as alkylamines, aralkyl amines, arylamines, alicyclic amines, etc. For example, a simple amide such as

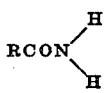

when reacted with one or more moles of ethylene oxide may yield hydroxylated amides such as

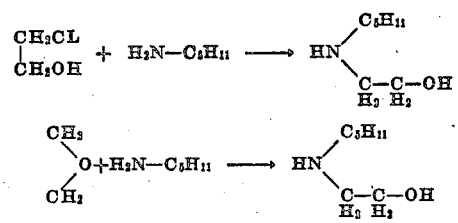

and the like; RCO being an acyl radical derived from a detergent-forming carboxy acid. Likewise a suitable hydroxyalkyl-alkylamine can be prepared by treating an alkyl amine with a chlorhydrin. The following reactions are illustrative:

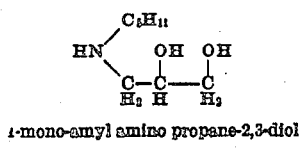

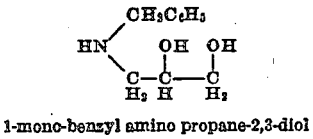

In the foregoing reactions the ethylene oxide and ethylene chlorhydrin may be regarded as derivatives of glycol. Comparable amines which may be regarded as derived from trihydric alcohol instead of a dihydric alcohol as the ultimate parent material also afford suitable hydroxylated amines, the following being illustrative.

$$HN\begin{matrix} C_5H_{11} \\ \\ C-C-C \\ H_2\ H\ \ H_2 \end{matrix}\begin{matrix} OH\ OH \end{matrix}$$

1-mono-amyl amino propane-2,3-diol $$HN\begin{matrix} CH_2C_6H_5 \\ \\ C-C-C \\ H_2\ H\ \ H_2 \end{matrix}\begin{matrix} OH\ OH \end{matrix}$$

1-mono-benzyl amino propane-2,3-diol

Similar materials are obtainable from glycidol and also are obtainable from alcohol ethers such as diglycerol, diethylene glycol and the like instead of glycols, glycerol and the like. Similar derivatives are obtainable from alicyclic amines such as cyclohexylamine, methylcyclohexylamine and the like by reacting such amines with glycerol monochlorhydrin or the like.

Hereinabove hydroxylated amides suitable for forming ester products with polybasic carboxy acids have been described wherein the hydroxyl or the equivalent which reacts with a polybasic carboxy acid either may occur as part of an hydroxy acyl radical derived from a detergent-forming carboxy acid and attached to the amide nitrogen or may occur as attached to some other organic radical or residue that is in the amino-hydrogen position. It is apparent, however, that the hydroxyl or the equivalent may occur in both positions. Thus any of the hydroxylated amides above described containing an hydroxyl in an organic radical or residue which is in the amino-hydrogen position and which does not contain an acyl radical directly attached to the amide nitrogen may comprise an acyl radical derived from a detergent-forming carboxy acid containing one or more hydroxyls or the equivalent that is available for reaction with a polybasic carboxy acid. In order to exemplify the formation of an ester product from a polyhydroxyamide of the character just mentioned and to afford at the same time an example of a preferred ester product for increasing the dirt removal rate of filtering media, the following specific example may be given.

Approximately 300 pounds of ricinoleoamide is reacted with approximately 90 pounds of ethylene oxide to produce a compound having the following formula, $$HOC_{17}H_{32}CO.N(C_2H_4OH)_2$$

The polyhydroxy amide thus produced may then be caused to react with phthalic anhydride to give a compound of the following composition, $$HOOC_6H_4COOC_{17}H_{32}.CO.N(C_2H_4OOCC_6H_4COOH)_2$$

The foregoing compound is suitable as it is. However, if desired, one or more of the free carboxyl groups may be neutralized as by esterification. Thus continuing the foregoing example the compound produced as above described may be reacted with 92 pounds of glycerol to give an esterified material whose composition cannot be indicated exactly because reactions take place between various hydroxyls of the glycerol and various carboxyls, and the resulting product may comprise a mixture of different esters, some acid, some basic and some neutral.

In the foregoing example instead of employing ethylene oxide one may employ an equivalent weight of propylene, glycide, etc.

As indicated in the foregoing example, an ester product produced by reaction between a polybasic carboxy acid and a hydroxylated amide containing an acyl radical derived from a detergent-forming carboxy acid may contain one or more free carboxyl groups. Any such free carboxyl group may be left as it is or the acid hydrogen atom may be replaced by any other cation or hydrogen ion equivalent that has a univalent linkage with the carboxyl residue. Thus the acid hydrogen may be replaced by esterification with a mono-hydric alcohol such as methyl, ethyl, propyl, butyl, amyl, and hexyl alcohols and the like. It is preferred, however, to neutralize the acid hydrogen with an oxy alkyl group containing an alkaline oxide group, e. g., by reaction with an alcohol that has been treated with an alkylene oxide such as ethylene oxide so that the carbon atoms of the oxyalkyl group are interrupted by one or more oxygen atoms. The acid hydrogen may also be replaced by reaction with polyhydric alcohols which may be aliphatic, aromatic, aralkyl, cyclic, heterocyclic, etc., such as ethyleneglycol, glycerol, erythriol, sorbitol, mannitol, sorbitan, mannitan, phenyl glycerol, etc. The acid hydrogen may also be replaced by ammonia or by a metal and such compounds are referred to as salts. Monovalent metals such as sodium, potassium, etc., are included and likewise polyvalent metals such as calcium, iron, magnesium, etc., which may, for example, replace the acid hydrogen of a plurality of free carboxyl groups in the same or different ester molecules and thereby become linked with the individual carboxyl residues by a univalent linkage and act as a hydrogen ion equivalent. The acid hydrogen may also be replaced by reaction with an amine, e. g., amyl amine, diamylamine, benzyl amine, cyclohexyl amine, etc., or by reaction with an amino-alcohol such as mono-, di- or tri-ethanol amine, mono-, di- or tri-propanol amine, amino methyl propane diol, etc., involving the alcoholic hydroxyl or simple neutralization. When reference is made to an ester product containing a free carboxyl group, it is intended that the product contain a COOH group in which the acid hydrogen has not been replaced. When reference is made to a carboxylic group, the group may be in the acid form in which the acid hydrogen has not been replaced or may comprise some other atom or group replacing the acid hydrogen as a hydrogen ion equivalent. The ester reaction is regarded as involving a polybasic carboxy acid whether the acid hydrogen of one or more of the carboxyl groups is replaced by a cation before or after the esterification reaction.

It is to be noted that other forms of the ester product suitable for increasing the filtering rate of filtering media may be made in other ways. Thus a polybasic carboxy acid may be reacted with a diamide. For instance, 2 moles of a fatty acid chloride may be reacted with one mole of an alkylol amine to produce an hydroxylated amide having two acyl (RCO) groups in the amino hydrogen position derived from a detergent-forming acid. Similarly, in an hydroxylated diamide one or more hydroxyl groups or the equivalent may occur in one or the other or both of the acyl groups. Moreover, if the polybasic carboxy acid happens to be tribasic it is obvious that one might neutralize one residual hydrogen atom with a metal and perhaps leave another carboxylic hydrogen unneutralized. In the event that the detergent-forming carboxy acid amide is derived from an hydroxylated material such as ricinoleic acid, hydroxystearic acid, etc., then an hydroxyl which happens to be present in the acyl radical may be subjected to various reactions, e. g. in known ways such as acylation with mono-basic or poly-basic carboxy acids and the like. Any residual hydroxyl of an organic group that does not contain an acyl radical directly attached to the amide nitrogen, e. g. a free hydroxyl in a polyhydric alcohol residue that replaces the acid hydrogen of a carboxyl group, also may be subjected to similar reactions. Similarly, if the detergent-forming carboxy acid is derived from an unsaturated acid, e. g. oleic acid or the like, it may be subjected to the usual reactions involving the ethylene linkage, such as halogenation, etc. A chlor alkyl radical is regarded as the equivalent of an alkyl radical. More than one of the carboxyl groups of the polybasic carboxy acid may react with more than one of the hydroxyl groups or the equivalent of a polyhydroxylated amide and a neutral ester may be produced in this way. The resulting ester may contain a free carboxyl group (which may be called acidic type), or it may contain a free hydroxyl group (which may be called basic type), or it may contain neither free carboxyl nor free hydroxyl groups (which may be called neutral type), or it may contain one or more free carboxyls and one or more free hydroxyls (which may be called amphotric type). In any event, if polybasic carboxy acids having two or three carboxyl groups may be represented as $B(COOH)_{M'}$ wherein $M'$ is 2 or 3 and B denotes the polybasic carboxy acid residue, the ester product will contain the group $-OOCB(COOZ)_n$ attached to an organic group (either an acyl group or a non-acyl group) in an amino-hydrogen position, $n$ being 1 or 2 and Z being a hydrogen atom or a hydrogen atom equivalent of the character above mentioned.

So long as the amide contains an RCO—N group wherein the RCO is an acyl radical derived from a detergent-forming carboxy acid having at least 8 carbon atoms and an $-OOCB(COOZ)_n$ group of the character above described attached to a suitable group in an amino hydrogen position, the amide may contain one or two amino hydrogens or may contain one or two substituent groups in the amino hydrogen position, said group preferably being of the hydrocarbon or oxy hydrocarbon type such as alkyl, alkylol, alkylene oxy, etc.

In addition to common carboxy fatty acids and other detergent-forming carboxy acids one may also employ fatty acids obtained by drastic oxidation of fatty acids obtained from non-drying and semi-drying oils. Thus cottonseed oil fatty acids, rapeseed oil fatty acids, and corn oil fatty acids and the like can be oxidized and amides derived from such oxidized fatty acids are regarded as containing an acyl group derived from a fatty acid containing at least 8 carbon atoms. Such fatty acids can be oxidized so as to produce hydroxy or oxy groups in the acyl radical. Similarly, unsaturated oils such as castor oil, soy bean oil, etc., may be oxidized and then treated to convert the glycerides or esters into fatty acids by any suitable hydrolytic process such as the Twitchell process. Oxidized fatty acids of the character referred to may be readily treated to obtain amides and hydroxy or oxy amides. The oxidation may be carried out by known methods by air, ozone, oxygen, organic peroxides, potassium permanganate or the like.

Some of the ester products above defined are somewhat soluble in oil while others are substantially insoluble. If the ester product is such that only one part or less is soluble (as determined by usual visual methods) in ordinary straight run kerosene from Pennsylvania crude, the product is to be regarded as substantially insoluble in oil. For use in increasing the filtering rate of filtering media according to this invention it is preferable that the ester product be substantially insoluble in oil. Most of the ester products hereinabove described are sub-resinous in character and of a tarry or balsam-like consistency. In the case of some of the interacting materials, especially the poly-hydroxylated amides and polybasic carboxy acids, it is possible by prolonged heating at relatively high temperatures to obtain a product that is of a hard horny character and lacks appreciable solubility in oil and in the lower aliphatic alcohols. Care should be taken not to produce such hard and totally oil-insoluble bodies. It may be mentioned, however, that even a trace of solubility such as a few parts dissolving in one hundred thousand parts of kerosene of the character above mentioned affords a satisfactory product for increasing the filtering rate of filtering media in the practice of this invention.

The production of preferred ester products which are substantially oil insoluble or of low oil solubility can readily be achieved having in mind the following factors which influence the oil solubility of the ester product. Thus oil solubility is decreased when the polybasic carboxy acid employed in the esterification reaction has a minimum number of carbon atoms. For example, a products made using citric or maleic acid will have less oil solubility than a product derived by reaction with phthalic acid or naphthalic acid. Oil solubility is likewise decreased when an organic group in the amino hydrogen position includes an oxygen containing group such as an oxy hydrocarbon group. Thus if the acyl group derived from a detergent-forming acid contains an hydroxy or oxy group oil, solubility is decreased. Similarly if, instead of a hydrocarbon alkyl group in the amino hydrogen position, a group is present that contains oxygen such as an alkaline oxy group or a free hydroxy group, oil solubility is decreased. Oil solubility is also affected by the nature of any substituent for the acid hydrogen of a residual carboxyl group of the polybasic carboxy acid that may be present. If the acid hydrogen is permitted to remain as it is or is replaced by a metal or ammonia the ester product in such acid or salt form will have less oil solubility than if the acid hydrogen were replaced by reaction with a monohydric alcohol or a high mole amine, and ester products containing a free carboxyl group or a carboxylic group in the form of a salt are preferred for use in the practice of this invention. If the acid hydrogen of a free carboxyl group is placed by reaction with a polyhydric alcohol such as glycerol, or with an amino alcohol such as triethanol amine so that the group replacing the acid hydrogen is an hydroxylated organic group, oil solubility is decreased and such substances are preferred. Moreover, when the acid hydrogen is replaced by a radical containing an alkylene oxide group, e. g. by reaction with an ether alcohol, oil solubility is decreased and such substances are among substances that are preferred in the practice of this invention. Oil solubility can also be decreased by decreasing the number of carbon atoms in the acyl radical that is derived from a detergent-forming carboxy acid. While there are other factors affecting oil solubility, the foregoing discussion is believed to be adequate to enable one to obtain ester products having desired properties of oil solubility. While it is preferable to employ ester products which are substantially insoluble in oil as defined above, those ester products which are more soluble in oil may likewise be employed.

Generally speaking, the ester products hereinabove described are substantially water insoluble, namely, are not more soluble than 1 part in 1000 parts of water at 50°-80° F. Water insolubility is not particularly important, however, because water in more than very small amounts does not occur in the oil which is used in the lubricating system of an internal combustion engine and which is clarified by the use of a filter. The ester products that are used to increase the dirt removal rate of filtering media in the practice of this invention preferably are totally or substantially water insoluble.

In the preparation of esterification products adapted for use in increasing the dirt removal rate of filtering media, the esterification reaction may be caused to take place readily upon the application of heat to the intimately commingled reacting materials, the reaction being the more rapid the higher the temperature that is employed, but care should be taken not to employ excessively high temperatures which would cause decomposition. The reaction may be caused to occur in the presence of an inert solvent such as xylene which may be removed after the completion of the reaction. When water results from the esterification reaction, the esterification reaction can be facilitated when an inert solvent such as xylene is employed by conducting the reaction under a reflux condenser using a water trap to remove water as it is formed. The reaction may also be hastened by passing through the reacting mixture a dried inert gas such as carbon dioxide or nitrogen which carries off water as it is formed. When the anhydrides of the polybasic carboxy acids are employed there is no water formed as a reaction product and steps to remove water as formed to hasten the reaction (removal of water is not, however, essential to the reaction) are obviated. Generally speaking the reaction takes place readily by simply heating the reagents entering into the reaction in desired stoichiometric proportions at a temperature above the boiling point of water, usually between about 110° to 160° C. provided there is no decomposition.

Inasmuch as hydroxylated amides containing an acyl group derived from a detergent-forming carboxy acid may contain a plurality of hydroxyl groups or the equivalent, and inasmuch as polybasic carboxy acids entering into esterification reaction therewith contain a plurality of carboxyls, it is apparent that the reaction may take place in various molecular ratios. It is also apparent that the molecular weight of the product may vary widely. The molecular weight of the ester product, as determined from cryoscopic methods or from obvious composition of the ester, usually runs between about 300 and about 3000 and seldom is over about 5000. Ester products having a molecular weight over about 10,000 preferably are not employed.

During the esterification reaction there may be some polymerization, especially if the conditions of esterification are prolonged. This polymerization is due primarily to formation of more complicated compounds from monomeric forms through the formation of ester linkages with loss of water. It is to be understood that reference to ester products produced by esterification between a polybasic carboxy acid and an hydroxylated amide includes possible polymerized forms as well as simple esters or monomers.

The products produced as above described which are suitable for increasing the dirt removal rate of filtering media are soluble in one or more of such solvents as lower aliphatic alcohols (ethyl to octyl), carbon tetrachloride, xylene, toluene, etc. This facilitates application of the ester products to filters and filtering media. Preferably, as aforesaid, the product is prepared so as to be substantially insoluble, or of low solubility, in oil.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal polybasic carboxy acid and an hydroxylated amide in which there is present directly attached to an amide nitrogen an acyl radical having at least 8 carbon atoms and derived from a detergent-forming carboxy acid having at least 8 carbon atoms.

11. A method of increasing the dirt removal rate of a filtering medium for removing dirt from the lubricating oil of an internal combustion engine, said method comprising contacting oil that is filtered by said filtering medium with an ester amide that is a product of esterification reaction between a polybasic carboxy acid and an hydroxylated amide in which there is present directly attached to the amide nitrogen an acyl radical having at least 8 carbon atoms and derived from a detergent-forming carboxy acid having at least 8 carbon atoms.

12. A method according to claim 11 wherein said acyl radical is derived from a fatty acid having 8 to 32 carbon atoms.

13. A method according to claim 11 wherein said ester amide contains a salt carboxylic radical.

14. A method according to claim 11 wherein said ester amide contains a free carboxyl group.

15. A method according to claim 11 wherein said ester amide contains an oxy hydrocarbon group in addition to the acyl and carboxylic groups.

16. A method according to claim 11 wherein said ester amide is substantially insoluble in oil.

17. A method according to claim 11 wherein said ester amide is substantially insoluble in oil and is substantially insoluble in water.

18. A method of increasing the dirt removal rate of a filtering medium for removing dirt from the lubricating oil of an internal combustion engine, said method comprising contacting oil that is filtered by said filtering medium with an ester amide which is a product of esterification reaction between a polybasic carboxy acid and an hydroxylated acyl radical that is contained in an amide and is directly attached to the amide nitrogen and that has at least 8 carbon atoms and is derived from a detergent-forming carboxy acid containing at least 8 carbon atoms.

19. A method according to claim 18 wherein said hydroxylated acyl radical is derived from an hydroxylated fatty acid.

DONALD H. WELLS.
MELVIN DE GROOTE.